US007455309B2

(12) United States Patent
Dror

(10) Patent No.: US 7,455,309 B2
(45) Date of Patent: Nov. 25, 2008

(54) AUTOMATICALLY ENGAGING SAFETY DEVICE FOR A WHEELCHAIR OR OTHER MEDICAL DEVICE

(76) Inventor: Meyrav Dror, 20 Alaska Ave., Jackson, NJ (US) 08527

( * ) Notice: Subject to any disclaimer, the term of this patent is extended or adjusted under 35 U.S.C. 154(b) by 208 days.

(21) Appl. No.: 11/523,284

(22) Filed: Sep. 18, 2006

(65) Prior Publication Data

US 2008/0067780 A1 Mar. 20, 2008

(51) Int. Cl.
*B60T 1/14* (2006.01)

(52) U.S. Cl. .................................... 280/304.1; 188/2 F

(58) Field of Classification Search .............. 280/304.1, 280/250.1; 188/2 F, 2 R, 5

See application file for complete search history.

(56) References Cited

U.S. PATENT DOCUMENTS

| | | | | |
|---|---|---|---|---|
| 4,019,752 | A * | 4/1977 | Leon et al. | 280/1 |
| 6,279,936 | B1 * | 8/2001 | Ritchie et al. | 280/304.1 |
| 6,688,437 | B2 * | 2/2004 | Usherovich | 188/2 F |
| 6,739,610 | B2 * | 5/2004 | Connors et al. | 280/304.1 |
| 2002/0175027 | A1 * | 11/2002 | Usherovich | 188/2 F |

* cited by examiner

*Primary Examiner*—Tony H. Winner
(74) *Attorney, Agent, or Firm*—Mandel & Peslak, LLC; Arthur M. Peslak, Esq.

(57) ABSTRACT

A safety device for a wheelchair, or similar device, is disclosed. The device is a wheel assembly directed to preventing rearward movement of the device when the person exits or enters the device thus preventing potential accidents.

5 Claims, 4 Drawing Sheets

AUTOMATICALLY ENGAGING SAFETY DEVICE FOR A WHEELCHAIR OR OTHER MEDICAL DEVICE

BACKGROUND OF THE INVENTION

The present invention is directed to the field of wheelchairs and other medical devices. In particular, the present invention is directed to a brake to allow the user to safely exit from the wheelchair or walker. One problem with the existing devices is that when the user stands up or tries to exit or enter the wheelchair or other medical device, there is the possibility that the wheelchair or walker will start to roll backwards. When that happens, the user may not be entirely out and may fall backwards as the device rolls in that direction. The available devices may include manual brakes on the wheels in an attempt to prevent such falling. However, often times a caregiver may forget to set the brake and the patient may fall if he or she attempts to exit or enter on his or her own. The object of the present invention is to solve this problem by providing an automatically engaging safety device.

SUMMARY OF THE INVENTION

The present invention is directed to an automatic safety device for a medical device such as a wheelchair, walker, shower chair or hospital bed. The present invention will prevent the device from rolling backward out from under the patient during entry to or exit from the device. The device is automatically engaged by the downward force produced from the patient's weight upon entry or exit.

DETAILED DESCRIPTION OF THE INVENTION

Figure 1:
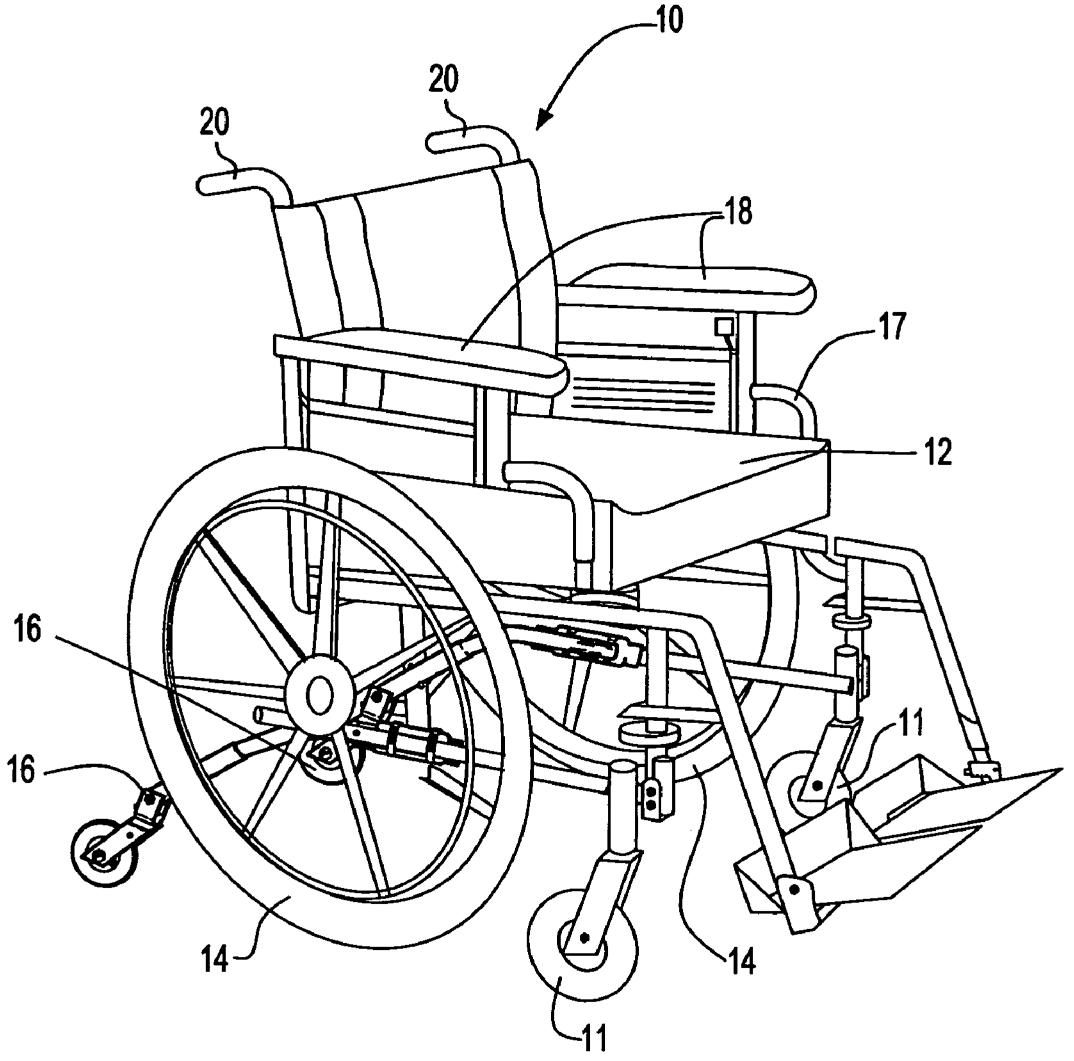
FIG. 1 is a plan view of an embodiment of the present invention installed on a wheelchair.

The present invention will now be described in terms of the presently preferred embodiment thereof as illustrated in the drawings. Those of ordinary skill in the art will recognize that many modifications may be made to the described embodiment without departing from the spirit or scope of the present invention as claimed.

A wheelchair 10 is illustrated in FIG. 1. The wheelchair 10 comprises a seat 12, two large rear wheels 14 and two small front wheels 11. The seat 12 comprises a frame 17, side armrests 18 and push handles 19. In the available wheelchairs, a user in the seat 12 will tend to push down and backward on the side arm rests 18 to exit or enter the wheelchair 10. When that happens if the manual brake isn't engaged the small front wheels 11 or the large rear wheels 14 tend to begin to roll backwards possibly causing the person to fall as the wheelchair moves backward out from under the user.

Figure 2:
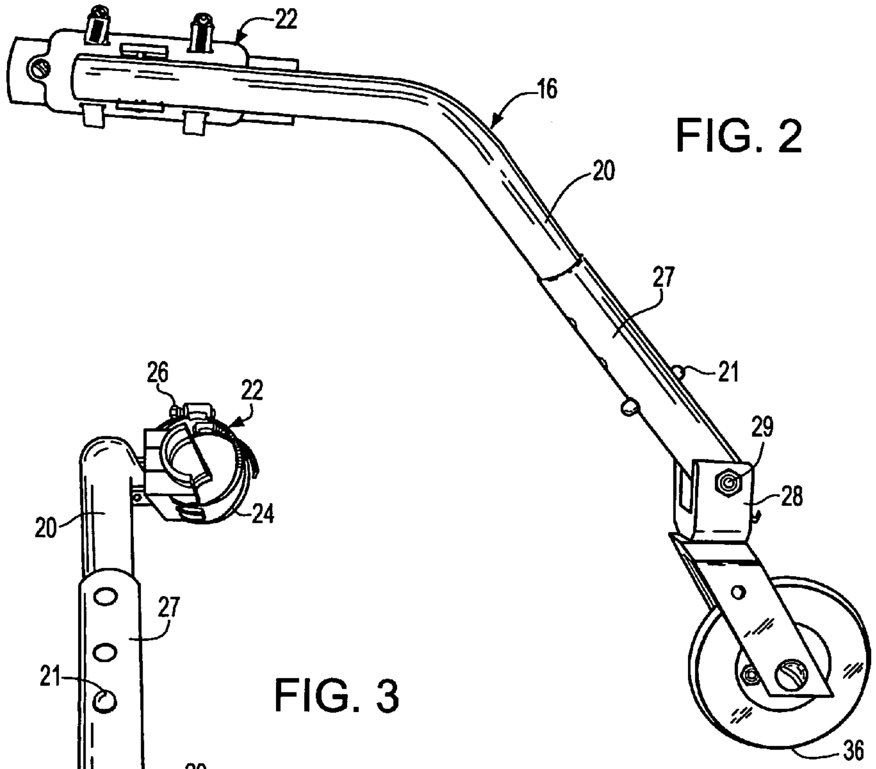
FIG. 2 is a plan view of an embodiment of the present invention.
Figure 3:
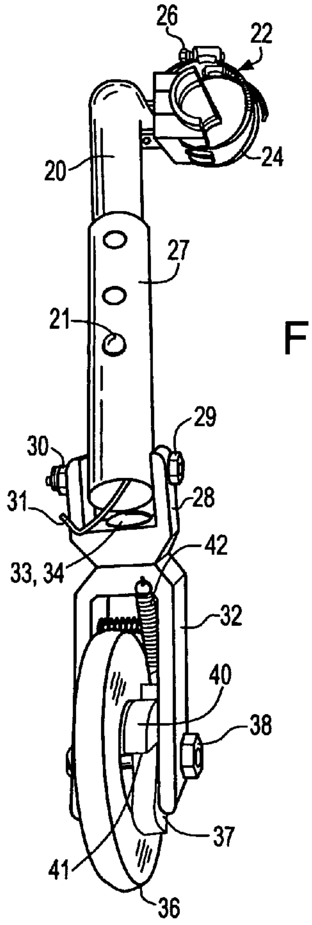
FIG. 3 is a plan view of an embodiment of the present invention.
Figure 4:
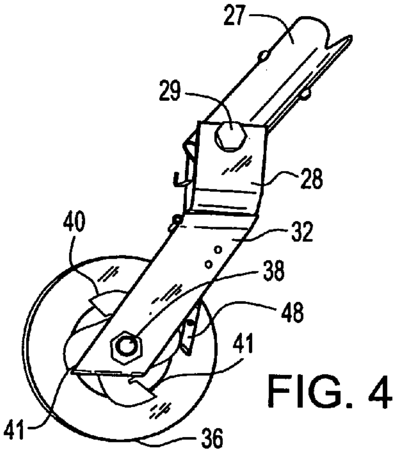
FIG. 4 is a plan view of an embodiment of the present invention.
Figure 5A:
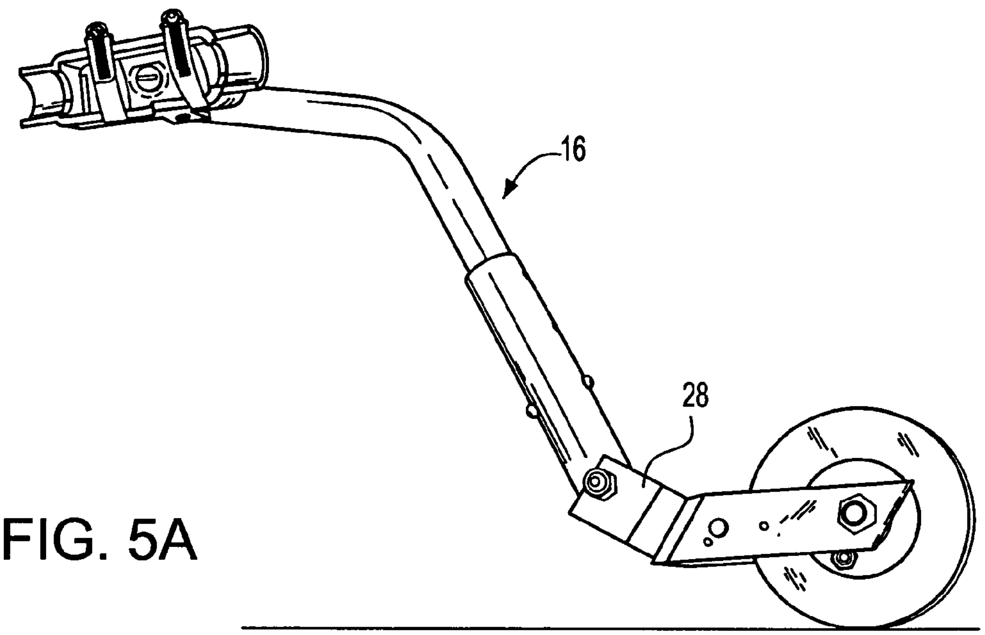
FIG. 5A illustrates an embodiment of the present invention in use.
Figure 5B:
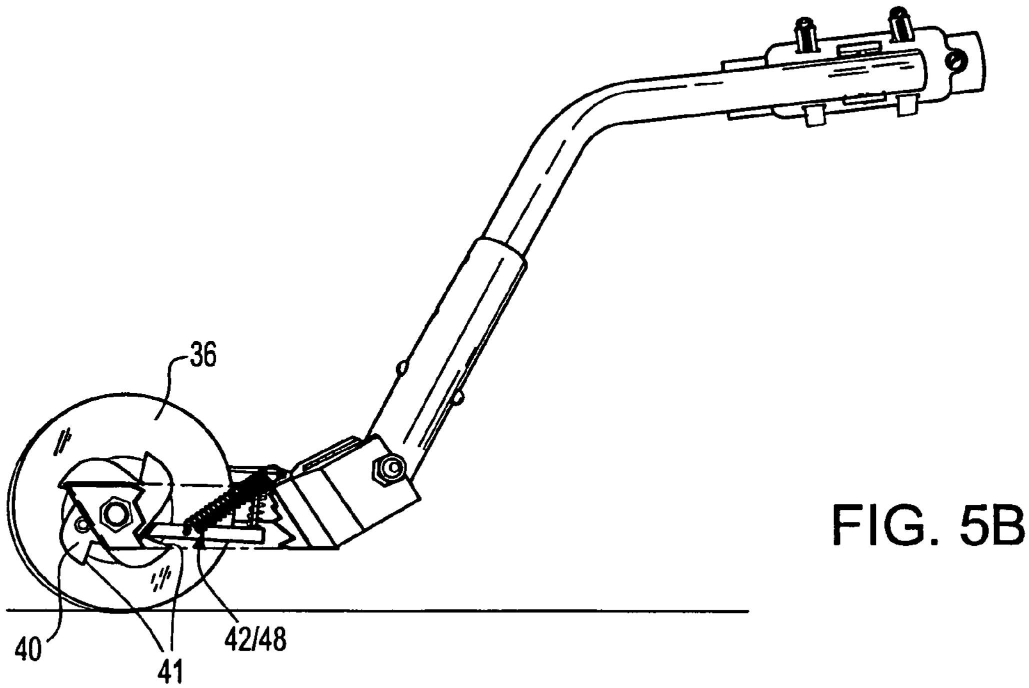
FIG. 5B illustrates an embodiment of the present invention in use.
Figure 6A:
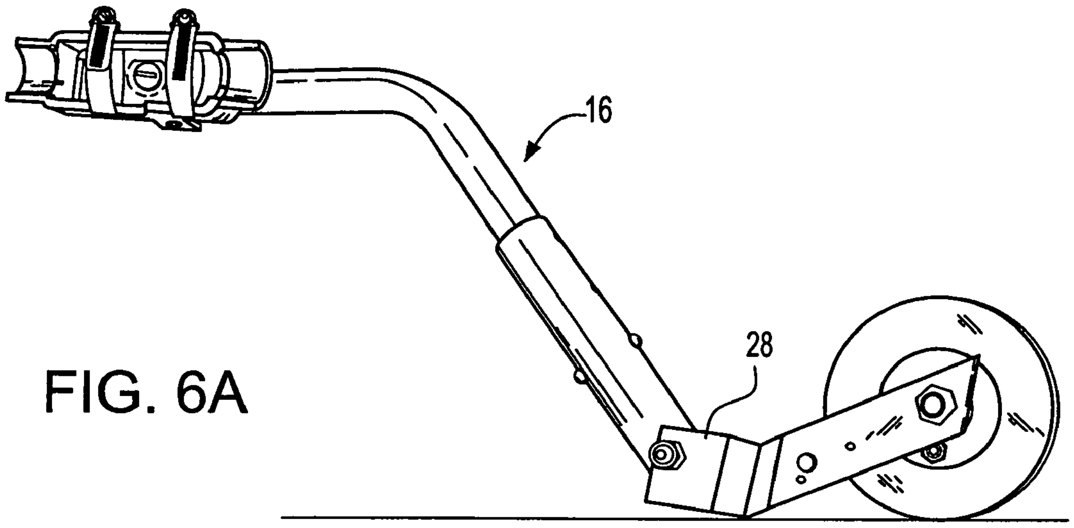
FIG. 6A illustrates an embodiment of the present invention in use.
Figure 6B:
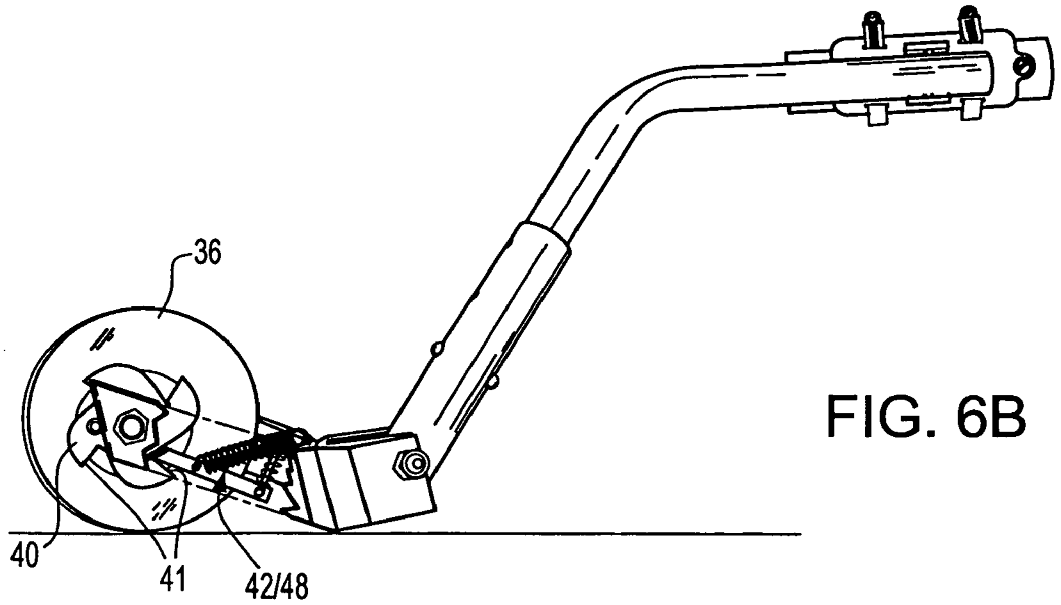
FIG. 6B illustrates an embodiment of the present invention in use.

As shown in detail in FIGS. 2-4, the present invention comprises a wheel assembly 16 that prevents the wheelchair 10 from rolling backward as the person enters or exits the wheelchair 10. The wheel assembly 16 comprises an upper tubular leg 20 that adjustably connects to the bottom of the wheelchair frame 17 by means of a bracket 22. The bracket 22 comprises an adjustable circular strap 24 that can be tightened around the wheelchair frame 17 by means of a screw 26. By adjusting the screw 26, the circumference of the strap 24 is adjusted to fit the circumference of the frame 17. The upper tubular leg 20 is fitted with a button 21 that is adapted to engage one of a plurality of mating openings 23 on the lower tubular leg 27. The lower tubular leg 27 is adapted to slidingly receive upper tubular leg 20. The appropriate height from the wheelchair frame 17 to the ground can be adjusted in this manner.

A first bracket 28 is rotatably connected to the lower tubular leg 27 by means of a conventional nut 29 and bolt 30. In addition, a spring 31 is connected between the bolt 29 and bracket 28. A second bracket 32 is rigidly connected to the first bracket 28 by means of a second nut 33 and bolt 34. A wheel 36 and axle 38 is connected to an open end 32 of bracket 28. In addition, a generally star-shaped sprocket 40 is also disposed on the axle 38. The sprocket 40 comprises a plurality of spokes 41 between the wheel 36 and bracket 28. A spring-loaded lever 42 is connected to the bracket 32 and is adapted to engage the sprocket spokes 41.

Two of the wheel assemblies 16 are attached to the wheelchair frame 17 as shown in FIG. 1. The use of the sprocket 40 and lever 42 allows the wheelchair 10 to be moved forward or sideways or in a circular motion. However, if the person gets up or sits down and the wheels start to move in a backward direction, the lever 48 will engage the nearest spoke 41 on the sprocket 40 and prevent rearward movement of the wheel. In addition, the downward force from the weight of the person on the armrests 17 will cause the first bracket 28 to pivot downward on the tubular leg 18 and collapse the leg onto the floor. As shown in FIGS. 5*a*-6*b*, at that point, there will be no further movement of the wheelchair. After the patient enters or exits, and the downward force from the person's weight is removed, the spring arm 42 will cause the wheelchair 10 to return to it original position.

The wheel assembly 16 has been described in connection with a wheelchair 10. However, it is contemplated that the present invention can be easily adapted to other medical devices as well, such as a shower chair, a medical bed or a walker.

Those of ordinary skill in the art will recognize that the foregoing merely describes the preferred embodiment of the present invention and that many obvious modifications may be made thereto without departing from the spirit or scope of the present invention as set forth in the claims.

What is claimed is:

1. An automatically engaging safety assembly for a medical device to prevent rolling of the device comprising:

a) a generally vertically disposed tubular member adapted to be engaged to the bottom of the medical device;

b) a spring loaded means pivotally attached to the tubular member;

c) a wheel assembly;

d) a receiving means for connecting the wheel assembly to the spring-loaded means wherein the wheel assembly comprises an axle, a wheel attached to the axle, a sprocket comprising a plurality of spokes attached to the axle and a spring loaded lever attached to the receiving means; and e) a projection for engaging one of the plurality of spokes upon application of a generally vertically directed downward force to the medical device thereby causing the spring loaded means to pivot the tubular leg downward to prevent rolling of the medical device.

2. The automatically engaging safety assembly of claim 1 wherein the medical device comprises a wheelchair.

3. The automatically engaging safety assembly of claim 1 wherein the medical device comprises a shower chair.

4. The automatically engaging safety assembly of claim 1 wherein the medical device comprises a walker.

5. The automatically engaging safety assembly in claim 1 wherein the medical device comprises a hospital bed.

* * * * *